United States Patent
Mori et al.

(10) Patent No.: US 6,884,547 B2
(45) Date of Patent: Apr. 26, 2005

(54) LITHIUM POLYMER BATTERY

(75) Inventors: Takaki Mori, Suwon (KR); Takeshi Koike, Suwon (KR); Hyung-bok Lee, Seoul (KR)

(73) Assignee: Samsung SDI Co., Ltd., Suwon-si (KR)

(*) Notice: Subject to any disclaimer, the term of this patent is extended or adjusted under 35 U.S.C. 154(b) by 456 days.

(21) Appl. No.: 10/124,263

(22) Filed: Apr. 18, 2002

(65) Prior Publication Data

US 2002/0197536 A1 Dec. 26, 2002

(30) Foreign Application Priority Data

Jun. 21, 2001 (KR) .......................................... 2001-35509

(51) Int. Cl.⁷ ............................................... H01M 4/58
(52) U.S. Cl. ................. 429/231.95; 29/623.1; 29/623.5
(58) Field of Search .................. 429/231.9, 231.95; 29/623.1, 623.5

(56) References Cited

U.S. PATENT DOCUMENTS

| 4,830,939 A | 5/1989 | Lee et al. ............... 429/192 |
| 5,681,357 A | * 10/1997 | Eschbach et al. .......... 29/623.5 |

FOREIGN PATENT DOCUMENTS

| EP | 0450981 A1 | 10/1991 |
| JP | 5-109310 | 4/1993 |

* cited by examiner

*Primary Examiner*—Bruce F. Bell
(74) *Attorney, Agent, or Firm*—Stein, McEwen & Bui, LLP

(57) ABSTRACT

A lithium polymer battery includes a cathode, an anode and a porous separator disposed between the cathode and the anode. A first polymeric electrolyte is positioned on a first surface of the separator in contact with the cathode. A second polymeric electrolyte is positioned on a second surface of the separator layer in contact with the anode. The first and second polymeric electrolytes use host polymers having different pH levels in an aqueous solution extracted using water.

28 Claims, 2 Drawing Sheets

LITHIUM POLYMER BATTERY

CROSS-REFERENCE TO RELATED APPLICATION

This application claims the benefit of Korean Application No. 2001-35509, filed Jun. 21, 2001, in the Korean Intellectual Property Office, the disclosure of which is incorporated herein by reference.

BACKGROUND OF THE INVENTION

1. Field of the Invention

The present invention relates to a lithium polymer battery using a polymeric electrolyte, and more particularly, to a lithium polymer battery having improved charging/discharging efficiency and life cycle characteristics.

2. Description of the Related Art

Secondary batteries are essential components of various portable electronic devices and telecommunications equipment, such as portable audio devices, cellular phones, camcorders, notebook type computers and the like. Thus, there is an increasing demand for small, lightweight secondary batteries capable of charging and discharging so as to supply power to such devices and equipment.

Secondary batteries that are prevalently being developed and used include Ni—Cd batteries, Ni-MH batteries or lithium batteries. Lithium batteries are characterized by their excellent characteristics, such as long life span, high capacity and so on, and are highly promising as a next generation power source.

A liquid electrolyte is generally used in most conventional lithium secondary batteries. However, the use of the liquid electrolyte frequently causes damage to devices due to a leakage of the electrolyte solution. The leakage allows the inside of the battery to dry due to a volatile solvent and results in a shorting between electrodes.

To overcome the foregoing disadvantages, a solid electrolyte has been proposed in place of the liquid electrolyte. Solid electrolytes are generally free from leakage of the electrolytic solution and are easily processable. Thus, research into the solid electrolytes, in particular, polymeric electrolytes, is actively being carried out.

The ionic conductivity of a polymeric electrolyte has a great effect on the internal resistance of a lithium battery during charging and discharging, and further contribute to the efficiency of the battery. Thus, there is a need for an electrolyte that is capable of preventing shorts within the battery, while maintaining a high ionic conductivity by impregnating a large amount of an electrolytic solution and allowing a high mobility of the lithium ions.

Polymeric electrolytes are classified into pure polymeric electrolytes having a lithium salt retained into polymer, and polymeric gel electrolytes having an organic electrolytic solution and the polymer. The polymeric gel electrolytes are developed in an attempt to attain a gelled polymer so as to make the organic electrolytic solution non-flowable. Around 1990, polyethylene oxide, polyacrylonitrile and polysiloxane have been introduced as host polymers in U.S. Pat. No. 4,830,939 and in Japanese Patent Laid-open Publication No. Hei 5-109310. However, the polymeric gel electrolyte prepared from these polymers was still inadequate to be used in practice in terms of their ionic conductivity (i.e., approximately $10^{-4}$ S/cm).

In the middle of 1990, methods of impregnating an electrolytic solution in a large amount by decreasing the crystallinity of polymers by copolymerization (i.e., by using a vinylidene fluoride (VdF) and hexafluoropropylene (HFP) copolymer or an acryloyl allyl copolymer) by which the ionic conductivity of the electrolytic solution has improved to a practical level of $10^{-3}$ S/cm.

Hitherto, gel electrolytes having the same composition have, however, been applied between a cathode and an anode. Thus, the improvement of charging/discharging efficiency and life cycle characteristics is still not satisfactory. In other words, since the charging/discharging characteristics of the secondary battery are attributed to electrical oxidation-reduction reactions taking place at the cathode and anode, reaction conditions cannot be appropriately adjusted due to the gel electrolyte having the same composition applied to the cathode and anode. This occurs despite pH levels adjusted to optimize the reactions. Thus, the deterioration in the charging/discharging efficiency and the life cycle characteristics frequently occurs.

SUMMARY OF THE INVENTION

To solve the above and other problems, it is an object of the present invention to provide a lithium polymer battery having improved charging/discharging efficiency and life cycle characteristics by optimizing electrode reactions and controlling side reactions by using gel electrolytes having different compositions for a cathode and an anode.

Additional objects and advantages of the invention will be set forth in part in the description which follows and, in part, will be obvious from the description, or may be learned by practice of the invention.

To accomplish the above and other objects of the present invention, a lithium polymer battery according to an embodiment includes a cathode, an anode and a porous separator disposed between the cathode and the anode, a first polymeric electrolyte positioned on a first surface of the separator in contact with the cathode, and a second polymeric electrolyte positioned on a second surface of the separator in contact with the anode, wherein the first and second polymeric electrolytes use host polymers that produce different pH levels in corresponding first and second aqueous solutions which are extracted from the first and second polymeric electrolytes using water.

According to another embodiment of the present invention, the first polymeric electrolyte and the second polymeric electrolyte are stacked or coated on corresponding surfaces of the porous separator.

According to yet another embodiment of the present invention, the first polymeric electrolyte and the second polymeric electrolyte are impregnated into corresponding ones of the cathode and anode.

According to an aspect of the invention, the first and second polymeric electrolytes comprise organic electrolytic solutions and the polymeric electrolytes comprise lithium salts.

According to another aspect of the invention, the first aqueous solution extracted from a first host polymer of the first polymeric electrolyte has a higher pH level than the second aqueous solution extracted from a second host polymer.

According to yet another aspect of the invention, the first aqueous solution extracted from the first host polymer is a basic aqueous solution and the second aqueous solution extracted from the second host polymer is a neutral aqueous solution.

According to still another aspect of the invention, the first aqueous solution extracted from the first host polymer is a basic aqueous solution and the second aqueous solution extracted from the second host polymer is an acidic aqueous solution.

According to a further aspect of the invention, the first aqueous solution extracted from the first host polymer is a neutral aqueous solution and the second aqueous solution of the second host polymer is an acidic aqueous solution.

According to a still further aspect extracted from the invention, the first aqueous solution of the first host polymer has a pH level of 7.5 or higher.

According to a yet further aspect of the invention, the first aqueous solution extracted from the first host polymer has a pH level in the range of 8 to 11.

According to a yet still further aspect of the invention, the second aqueous solution extracted from the second host polymer has a pH level of lower than 7.5.

According to an additional aspect of the invention, the second aqueous solution extracted from the second host polymer has a pH level in the range of 5 to 7.5.

According to a yet additional aspect of the invention, the first host polymer of the first polymeric electrolyte is a polymer comprising a repeated unit of an ethylenically unsaturated compound having a nitrogen-containing substituent.

According to a still additional aspect of the invention, the first host polymer is a polymer comprising a repeated unit of at least one compound selected from the group consisting of vinylpyrridines, vinylpyrrolidones and dimethylaminoethylacrylates.

According to a yet still additional aspect of the invention, the first host polymer of the first polymeric electrolyte is a copolymer comprising a repeated unit of an ethylenically unsaturated compound having a nitrogen-containing substituent and another repeated unit of vinylidenefluoride.

According to another aspect of the invention, the host polymer of the first polymeric electrolyte is a terpolymer comprising a repeated unit of an ethylenically unsaturated compound having a nitrogen-containing substituent, another repeated unit of vinylidenefluoride and a further repeated unit of hexafluoropropylene.

According to still another aspect of the invention, the second host polymer of the second polymeric electrolyte is a polymer comprising a repeated unit of vinylidenefluoride.

According to a still yet another aspect of the invention, the second host polymer of the second polymeric electrolyte is a vinylidenefluoride-hexafluoropropylene copolymer or a copolymer further comprising a repeated unit of at least one compound selected from the group consisting of acrylic acid and maleic acid monoalkylester.

According to a further aspect of the invention, the maleic acid monoalkylester is maleic acid monomethylester.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Figure 1:
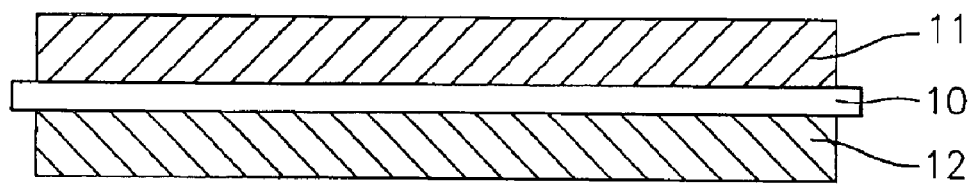
FIG. 1 is a schematic view illustrating a cross-sectional structure of a polymeric electrolyte and a separator according to an embodiment of the present invention.

Reference will now be made in detail to the present embodiments of the present invention, examples of which are illustrated in the accompanying drawings and specific examples of which are described below, wherein like reference numerals refer to the like elements throughout. The specific examples and embodiments are described below in order to explain the present invention by referring to the specific examples and to the figures.

The principle of the present invention will now be described in more detail. The present invention is directed to a lithium polymer battery having improved charging/discharging efficiency and life cycle characteristics by providing an optimum pH for electrical oxidation-reduction reactions taking place at a cathode and an anode during charging and discharging by using electrolytes having different compositions for the cathode and the anode.

The present invention is based on coincidentally good results of experiments of seeking the principle of the invention after carrying out the experiments sufficiently many times. Thus, although there is still ambiguity in terms of the precise mechanism, the general principle of the present invention can be deduced as follows without scientific inconsistency developed based upon the experiments.

The reactions occurring at the cathode and the anode of the lithium ion battery may be written as:

1) At cathode (for lithium cobalt oxide cathode)

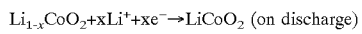
$Li_{1-x}CoO_2+xLi^++xe^-\rightarrow LiCoO_2$ (on discharge)

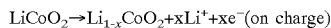
$LiCoO_2\rightarrow Li_{1-x}CoO_2+xLi^++xe^-$ (on charge)

2) At anode

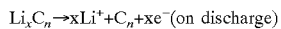
$Li_xC_n\rightarrow xLi^++C_n+xe^-$ (on discharge)

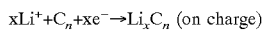
$xLi^++C_n+xe^-\rightarrow Li_xC_n$ (on charge)

At the cathode, a reduction reaction occurs on discharge in which lithium ions are bonded to electrons. On charge, an oxidation reaction occurs in which lithium cobalt oxide is converted into lithium ions, releasing electrons.

It is presumed that the pH level in the nonaqueous solution system, like in the battery solvent system of the present invention, is primarily influenced by the equilibrium of Bronsted acids and bases depending on the proton dissociation in a basic solvent system or a proton-based solvent such as admixed alcohol or moisture. Also, complete removal of the proton elements from the battery system is presumably impossible in actual practice.

At the cathode, an oxidation reaction takes place according to the potential of the cathode. In the oxidation reaction, the cathode releases protons and decays the cathode active material. The decayed cathode active material precipitates in the battery, which may act as a high-resistance factor, thus lowering the life cycle characteristics of the battery. Moreover, a higher pH level is an overvoltage factor during the oxidation reaction taking place at the cathode on charge, accompanied by the intrinsic charging/discharging of the battery, resulting in polarization. If a basic polymeric gel an embodiment of the present invention exists adjacent to the cathode, the above-described reaction mechanism is likely to occur, or the protons or acidic materials present from the initial stage of the reaction can be neutralized or changed into harmless forms. As such, the life cycle characteristics of the battery are improved. However, if the polymeric gel of the present invention is highly basic, the oxidation potential is extremely lowered, causing a loss due to the oxidation reaction and increasing the probability of deteriorating the capacity or cycle characteristics. Thus, it is empirically considered that the substantial hydrogen ion concentration of polymeric gel is expressed in pH of an aqueous solution of a polymeric gel electrolyte extracted from the electrolyte using water. The pH level of the aqueous solution is 7.5 or higher, and preferably 8 to 11 according to embodiments of the invention.

At the anode, a hydroxide ion (OH$^-$) of admixed alcohol or moisture presumably reacts with carbonate in an electrolytic solution, specifically a cyclic carbonate component, so that the carbonate may decompose. Thus, the reaction generates undesired reaction byproducts such as gaseous products. Thus, if the polymeric gel having an acidic group that is capable of accommodating an hydroxide ion exists adjacent to the anode, the hydroxide ion and basic material existing from the initial stage of the reaction can be neutralized or changed into harmless forms, which would improve battery characteristics. Thus, in the polymeric electrolyte for the anode, the pH level of an aqueous solution extracted from the electrolyte using water is less than 7.5. However, if the polymeric gel of the present invention is highly acidic, it may corrode metal elements of the battery. Thus, it is empirically considered that the pH level of polymeric gel for the anode, which is attributed to an aqueous solution from a polymeric gel electrolyte which is extracted using water, is between 5 to 7.5.

In the lithium polymer battery according to an embodiment of the present invention, a polymeric electrolyte from which a basic aqueous solution is extracted using water is used as the host polymer for a cathode. Further, the host polymer of a polymeric electrolyte for an anode results in a neutral aqueous solution when extracted using water.

The polymer from which a basic aqueous solution is extracted using water is a polymer of a compound containing a basic substituent. Examples thereof include polymers of ethylenically unsaturated compounds containing nitrogen substituents having lone-pair electrons, such as pyridine, pyrrolidone or an amino group. Examples of the ethylenically unsaturated compounds include vinylpyrridines, vinylpyrrolidones and dimethylaminoethyl acrylates. However, it is understood that additional polymers can be used or will be developed that result in base aqueous solutions.

The ethylenically unsaturated compounds containing the basic substituent are all or parts of repeated units of the host polymer. In detail, the ethylenically unsaturated compounds are copolymerizable with monomers of host polymers used as general polymeric electrolytes. Here, the monomers of host polymers used as the general polymeric electrolytes include vinylidenefluoride (VdF), hexafluoropropylene and a mixture thereof.

Examples of the host polymers used for the cathode include copolymers made of the ethylenically unsaturated compounds and vinylidenefluoride (VdF), and terpolymers made of the ethylenically unsaturated compounds, VdF and hexafluoropropylene. However, it is understood that other host polymers could be used according to additional embodiments of the invention.

Examples of the host polymers for the anode include polyvinylidenefluoride (PVdF), and a vinylidenehexafluoropropylene copolymer. However, it is understood that other host polymers could be used according to additional embodiments of the invention that also result in a neutral aqueous solution.

In the lithium polymer battery according to a further embodiment of the present invention, the polymeric electrolyte results in an acidic aqueous solution when extracted using water and is used as the host polymer for an anode. The host polymer of a polymeric electrolyte for a cathode results in a neutral aqueous solution when extracted using water.

According to an embodiment, the polymer which results in an acidic aqueous solution extracted using water is a polymer of a compound containing an acidic substituent. Examples of suitable polymers include polymers of ethylenically unsaturated compounds containing acidic substituents, such as acrylic acid or maleic acid monoalkyl ester. Here, the maleic acid monoalkyl ester is preferably maleic acid monomethyl ester, but is not restricted thereto. It is understood that other host polymers could be used or will be developed that also result in acidic aqueous solutions.

The ethylenically unsaturated compounds containing acidic substituents may be all or parts of repeating units of the host polymer. In detail, the ethylenically unsaturated compounds are copolymerizable with monomers of host polymers used as general polymeric electrolytes.

In the lithium polymer battery according to an additional embodiment of the present invention, the polymeric electrolyte results in a basic aqueous solution extracted using water and is used as the host polymer for a cathode. The host polymer of a polymeric electrolyte for an anode results in an acidic aqueous solution when extracted using water.

According to an embodiment of the invention, the polymer which results in a basic aqueous solution when extracted using water is a polymer of a compound containing a basic substituent. Examples of the polymer include polymers of ethylenically unsaturated compounds containing nitrogen substituents having lone-pair electrons, such as pyridine, pyrrolidone or an amino group.

The polymer which results in an acidic aqueous solution when extracted using water is a polymer of a compound containing an acidic substituent. Examples thereof include polymers of ethylenically unsaturated compounds containing acidic substituents, such as acrylic acid or maleic acid monoalkyl ester.

The ethylenically unsaturated compounds containing a basic substituent are all or parts of constituent repeating units of the host polymer. In detail, the ethylenically unsaturated compounds are copolymerizable with monomers of the host polymers used as general polymeric electrolytes.

The structure of a lithium polymer battery according to an embodiment of the present invention and a preparation method thereof will now be described with reference to the accompanying drawings.

Figure 2:
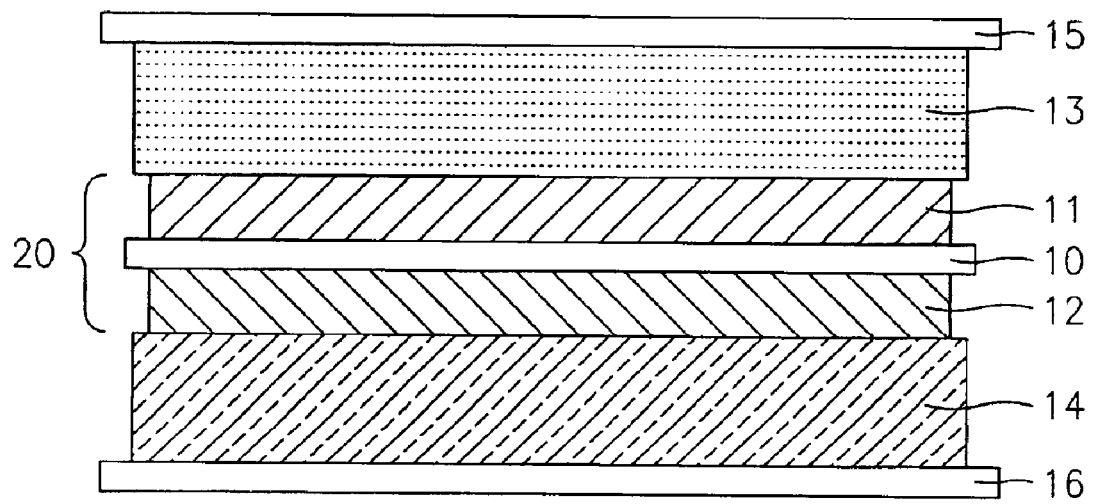
FIG. 2 is a schematic view illustrating a cross-sectional structure of a lithium battery using the polymeric electrolyte shown in FIG. 1.

FIG. 1 is a schematic view illustrating a cross-sectional structure of a polymeric electrolyte according to an embodiment of the present invention. A first polymeric electrolyte layer 11 and a second polymeric electrolyte layer 12 are formed on corresponding surfaces of a porous separator 10. The porous separator 10 can be any separator that is generally used in the art. In this case, both surfaces of the separator 10 are coated with the polymeric electrolyte compositions corresponding to a cathode 13 and an anode 14 as shown in FIG. 2 (i.e., the first and second polymeric electrolytes layers 11 and 12). The coated surfaces are gelled to thus prepare the separator 10 coated with polymeric gel electrolytes layer 11 and 12. The porous separator 10 with the gelled coatings is then interposed between the cathode 13 and the anode 14, thereby completing the lithium polymer battery.

FIG. 2 is a schematic view illustrating a cross-sectional structure of a lithium battery using a polymeric electrolyte layer 20 according to an embodiment of the present invention. The polymeric electrolyte layer 20 includes the first polymeric electrolyte layer 11 and the second polymeric electrolyte layer 12 formed on both surfaces of the separator 10. The first polymeric electrolyte layer 11 is in contact with the cathode 13 formed on one surface of a cathode current collector 15. The second polymeric electrolyte layer 12 is in contact with the anode 14 formed on one surface of an anode current collector 16.

In an alternative embodiment of the present invention, a lithium polymer battery is prepared by coating polymeric electrolyte composition layers 11 and 12 respectively for the cathode 13 and the anode 14 on the cathode 13 and the anode 14. The compositions are gelled, and a porous separator 10 is inserted between the cathode 13 and anode 14 coated with the respective polymeric electrolyte layers 11 and 12. Here, examples of the porous separator 10 include a polyethylene (PE) sheet, a polypropylene (PP) sheet and a combination thereof. However, it is understood that other porous separators could be used with or without one or both of the polymeric electrolyte layers 11 and 12.

In FIG. 2, the first polymeric electrolyte layer 11 and the second polymeric electrolyte layer 12 are not previously coated on corresponding surfaces of the porous separator 10, but are coated on the cathode 13 and the anode 14. The porous separator 10, which had no coatings, is simply interposed between the cathode 13 and the anode 14 coated with the first and second polymeric electrolyte layers 11 and 12, respectively.

A method of preparing a lithium ion polymer battery using a solid polymer electrolyte according to an embodiment of the present invention will now be described.

First, a cathode active material, a binder, a plasticizer and a conductive agent are sufficiently mixed to prepare a cathode active material composition. The cathode active material composition is coated on the current collector 15. The coating is dried to prepare the cathode 13. Here, aluminum mesh or foil is used as the cathode current collector 15.

Usable examples of the cathode active material include lithium oxides such as $LiCoO_2$, $LiNiO_2$ or $LiMn_2O_4$, in the content that is generally accepted in the art of preparation of the lithium polymer batteries. The binder used in the present invention is not specifically limited and any binder material used in the formation of a polymer matrix for a polymeric electrolyte can be used. However, it is understood that other usable examples of the cathode active material and/or the binder are available or will be developed.

Then, an anode active material composition is coated on the anode current collector 16 and dried to prepare the anode 14. Copper foil or mesh is used as the anode current collector 16. The anode active material composition includes an anode active material, a binder, a plasticizer and a solvent in a similar composition to that of the cathode active material composition. The anode active material composition optionally includes a conductive agent. Any materials that are generally used in the art of preparation of lithium polymer batteries can be used as each of the anode active material, the conductive agent, the binder and the solvent, in generally acceptable contents.

Usable examples of the anode active material include carbon and graphite. Also, usable examples of the conductive agent include carbon black. As the binder, a material for forming a polymer matrix of a polymeric electrolyte is generally used. However, it is understood that other anode active materials and/or the binders are available or will be developed.

In an example of the present invention, a nonaqueous solvent is used as the solvent for the electrolytic solution. In particular, the nonaqueous solution is generally used that bears an easily dissociable lithium salt due to its high dielectric constant and polarity. Examples of the solvent include at least one selected from the group consisting of propylene carbonate (PC), ethylene carbonate (EC), γ-butyrolactone, 1,3-dioxolane, dimethoxyethane, dimethyl carbonate, diethyl carbonate, tetrahydrofuran (THF), dimethylsulfoxide and polyethyleneglycol dimethylether. The content of the solvent used is a level that is generally accepted in the art.

For the lithium salt, lithium compounds dissociated from the organic solvent to generate lithium ions can be used without limitation. Examples of the lithium salt include at least one lithium salt selected from the group consisting of lithium perchlorate ($LiClO_4$), lithium tetrafluoroborate ($LiBF_4$), lithium hexafluorophosphate ($LiPF_6$), lithium trifluoromethansulfonate ($LiCF_3SO_3$) and lithium bistrifluoromethyansulfonylamide ($LiN(CF_3SO_2)_2$, but are not specifically restricted thereto.

According to another embodiment, a filler is further added to the polymeric electrode to increase the mechanical strength of the polymeric electrolyte. Examples of the filler include silica and kaoline, but are not specifically restricted thereto.

The prepared anode 14, polymeric electrolyte layer 20 and cathode 13 are stacked and incorporated to produce an electrode assembly. An electrolytic solution is impregnated into the electrode assembly, thereby completing a lithium polymer battery.

The present invention will now be described through the following examples. It is understood that the examples are provided to better describe embodiments of the invention, but not to restrict the present invention thereto.

First, the host polymers from which a basic or a neutral aqueous solution are extracted using water were prepared as follows.

SYNTHESIS EXAMPLE 1

1036 g of ion exchange water, 0.8 g of methylcellulose, 3.6 g of diisopropylperoxydicarbonate, 5.0 g of vinylpyrridine, 372 g of vinylidenefluoride and 28 g of hexafluoropropylene were put into a 2-liter autoclave, and then suspension-polymerized at 28° C. for 86 hours. After polymerization, the polymer slurry was dewatered, washed with water, and dried at 80° C. for 20 hours to produce a powdered polymer A with an intrinsic viscosity of 1.18, yielding 80%. 10 wt % of the polymer A was placed in water and stirred. Then, the pH level of a supernatant liquid was measured, proving to be 8.4.

SYNTHESIS EXAMPLE 2

1036 g of ion exchange water, 0.8 g of methylcellulose, 3.6 g of diisopropylperoxydicarbonate, 8.0 g of vinylpyrrolidone, 364 g of vinylidenefluoride and 25 g of hexafluoropropylene were put into a 2-liter autoclave, and then suspension-polymerized at 28° C. for 86 hours. After polymerization, the polymer slurry was dewatered, washed with water and dried at 80° C. for 20 hours to produce a powdered polymer B with an intrinsic viscosity of 1.18, yielding 80%. 10 wt % of the polymer B was placed in water and stirred to extract an aqueous liquid (i.e., a supernatant liquid). Then, the pH level of a supernatant liquid was measured, proving to be 8.2.

SYNTHESIS EXAMPLE 3

1036 g of ion exchange water, 0.8 g of methylcellulose, 3.6 g of diisopropylperoxydicarbonate, 7.6 g of dimethylaminoethylacrylate, 364 g of vinylidenefluoride and 25 g of hexafluoropropylene were put into a 2-liter autoclave, and then suspension-polymerized at 28° C. for 86 hours. After polymerization, the polymer slurry was dewatered, washed with water and dried at 80° C. for 20 hours to produce a powdered polymer C with an intrinsic viscosity of 1.18, yielding 80%. 10 wt % of the polymer C was placed in water and stirred. Then, the pH level of a supernatant liquid was measured, proving to be 8.9.

SYNTHESIS EXAMPLE 4

1176 g of ion exchange water, 0.3 g of methylcellulose, 3.3 g of diisopropylperoxydicarbonate, 372 g of vinylidene-fluoride and 28 g of hexafluoropropylene were put into a 2-liter autoclave, and then suspension-polymerized at 28° C. for 17 hours. After polymerization, the polymer slurry was dewatered, washed with water and dried at 80° C. for 20 hours to produce a powdered polymer D with an intrinsic viscosity of 1.18, yielding 80%. 10 wt % of the polymer D was placed in water and stirred. Then, the pH level of a supernatant liquid was measured, proving to be 7.1.

SYNTHESIS EXAMPLE 5

1036 g of ion exchange water, 0.8 g of methylcellulose, 3.6 g of diisopropylperoxydicarbonate, 5.0 g of acrylic acid, 372 g of vinylidenefluoride and 28 g of hexafluoropropylene were put into a 2-liter autoclave, and then suspension-polymerized at 28° C. for 65 hours. After polymerization, the polymer slurry was dewatered, washed with water and dried at 80° C. for 20 hours to produce a powdered polymer E with an intrinsic viscosity of 1.18, yielding 80%. 10 wt % of the polymer E was placed in water and stirred, and the pH level of the resulting supernatant liquid was measured, proving to be 6.6.

SYNTHESIS EXAMPLE 6

1036 g of ion exchange water, 0.8 g of methylcellulose, 3.6 g of diisopropylperoxydicarbonate, 8.0 g of maleic acid monomethylester, 364 g of vinylidenefluoride and 25 g of hexafluoropropylene were put into a 2-liter autoclave, and then suspension-polymerized at 28° C. for 86 hours. After polymerization, the polymer slurry was dewatered, washed with water and dried at 80° C. for 20 hours to produce a powdered polymer F with an intrinsic viscosity of 1.18, yielding 80%. 10 wt % of the polymer F was placed in water and stirred, and the pH level of a supernatant liquid was measured, proving to be 6.9.

EXAMPLE 1

1) Cathode Preparation 91 wt % of $LiCoO_2$ as a cathode active material, 6 wt % of carbon as a conductive agent and 3 wt % of PVdF as a binder were mixed, added to N-methylpyrrolidone (NMP) and stirred to produce a cathode active material slurry. Then, the cathode active material slurry was coated on either side of an Al foil as a cathode current collector, dried and rolled to produce a cathode sheet.

2) Anode Preparation 90 wt % of graphite powder as an anode active material and 10 wt % of PVdF as a binder were mixed, added to NMP and stirred to produce an anode active material slurry. Then, the cathode active material slurry was coated on either side of a Cu foil as an anode current collector, dried and rolled to produce an anode sheet.

3) Polymeric Electrolyte Preparation 10 wt % of the polymer A as prepared in Synthesis Example 1, 40 wt % of PC, 40 wt % of EC and 10 wt % of NMP were mixed, and lithium hexafluorophosphate ($LiPF_6$) was dissolved in the mixed solvent in the mole concentration of 1.0 mole per liter of the overall mixed solvent. Then, the resultant solution was heated at 100° C. and stirred to produce a homogenously viscous solution. The solution was then coated on one surface of a 25 μm thick, polypropylene microporous film separator (that is, on a cathode side) to a thickness of 10 μm and cooled at room temperature.

Next, 10 wt % of the polymer D as prepared in Synthesis Example 4, 40 wt % of PC, 40 wt % of EC and 10 wt % of NMP were mixed, heated at 100° C. and stirred to produce a homogenously viscous solution, which was then coated on the other surface of a 25 μm thick, polypropylene microporous film separator (that is, on an anode side) to a thickness of 10 μm and cooled at room temperature.

4) Battery Fabrication

The thus-prepared polymeric electrolyte was interposed between the active material coated surface of the cathode sheet and the active material coated surface of the anode sheet to produce a unit assembly. Then, lead wires were drawn out from the cathode and the anode, and then the unit assembly was wound. Subsequently, the resultant structure was put into an aluminum pouch to then be sealed, thereby completing a lithium polymer battery.

EXAMPLE 2

Except for using the polymer B as prepared in Synthesis Example 2 and which has a basic aqueous solution when extracted using water, instead of the polymer A, a lithium polymer battery was prepared in the same manner as in Example 1.

EXAMPLE 3

Except for using the polymer C as prepared in Synthesis Example 3 and which has a basic aqueous solution when extracted using water, instead of the polymer A, a lithium polymer battery was prepared in the same manner as in Example 1.

EXAMPLE 4

A cathode sheet and an anode sheet were prepared in the same manner as in Example 1.

10 wt % of the polymer E as prepared in Synthesis Example 5, 40 wt % of PC, 40 wt % of EC and 10 wt % of NMP were mixed, and lithium hexafluorophosphate ($LiPF_6$) was dissolved in the mixed solvent in the mole concentration of 0.8 mole per liter of the overall mixed solvent. Then, the resultant solution was heated at 100° C. and stirred to produce a homogenously viscous solution, which was then coated on one surface of a 25 μm thick, polypropylene microporous film separator (that is, on an anode side) to a thickness of 10 μm and cooled at room temperature.

Next, 10 wt % of the polymer D as prepared in Synthesis Example 4, 40 wt % of PC, 40 wt % of EC and 10 wt % of NMP were mixed, heated at 100° C. and stirred to produce a homogenously viscous solution, which was then coated on the other surface of a 25 μm thick, polypropylene microporous film separator (that is, on a cathode side) to a thickness of 10 μm and cooled at room temperature.

The thus-prepared polymeric electrolyte was interposed between the active material coated surface of the cathode sheet and the active material coated surface of the anode sheet to produce a unit assembly. Then, lead wires were drawn out from the cathode and the anode, and then the unit assembly was wound. Subsequently, the resultant structure was put into an aluminum pouch to then be sealed, thereby completing a lithium polymer battery.

EXAMPLE 5

Except for using the polymer F as prepared in Synthesis Example 6 and which has an acidic aqueous solution when extracted using water, instead of the polymer E, a lithium polymer battery was prepared in the same manner as in Example 4.

EXAMPLE 6

Except for using for a cathode side of the polymeric electrolyte the polymer A as prepared in Synthesis Example 1 and which has a basic aqueous solution when extracted using water, instead of the polymer D as prepared in Synthesis Example 4 and which has a neutral aqueous solution when extracted using water, a lithium polymer battery was prepared in the same manner as in Example 4.

EXAMPLE 7

Except for using for a cathode side of the polymeric electrolyte the polymer B as prepared in Synthesis Example 2 and which has a basic aqueous solution when extracted using water, instead of the polymer D as prepared in Synthesis Example 4, a lithium polymer battery was prepared in the same manner as in Example 4.

EXAMPLE 8

Except for using for a cathode side of the polymeric electrolyte the polymer C as prepared in Synthesis Examine 3 and which has a basic aqueous solution when extracted using water, instead of the polymer D as prepared in Synthesis Example 4, a lithium polymer battery was prepared in the same manner as in Example 4.

EXAMPLE 9

Except for using for a cathode side of the polymeric electrolyte the polymer A as prepared in Synthesis Example 1 and which has a basic aqueous solution when extracted using water, instead of the polymer D as prepared in Synthesis Example 4, a lithium polymer battery was prepared in the same manner as in Example 5.

EXAMPLE 10

Except for using for a cathode side of the polymeric electrolyte the polymer B as prepared in Synthesis Example 2 and which has a basic aqueous solution when extracted using water, instead of the polymer D as prepared in Synthesis Example 4, a lithium polymer battery was prepared in the same manner as in Example 5.

EXAMPLE 11

Except for using for a cathode side of the polymeric electrolyte the polymer C as prepared in Synthesis Example 3 and which has a basic aqueous solution when extracted using water, instead of the polymer D as prepared in Synthesis Example 4, a lithium polymer battery was prepared in the same manner as in Example 5.

COMPARATIVE EXAMPLE

Except for using for both cathode and anode sides of the polymeric electrolyte the polymer D as prepared in Synthesis Example 4, a lithium polymer battery was prepared in the same manner as in Example 1.

Figure 3:
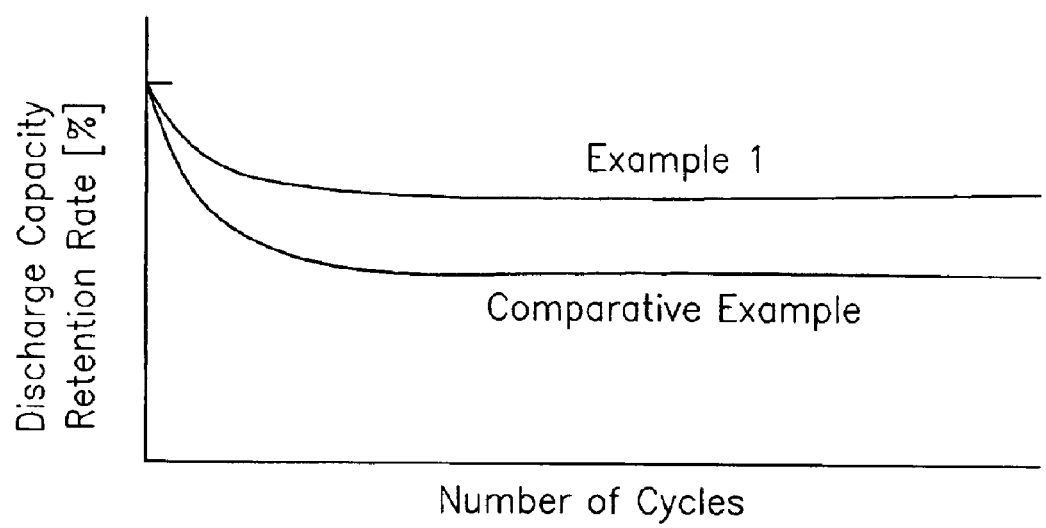
FIG. 3 is a graph showing a change in the discharge capacity retention characteristics depending on the number of cycles of lithium batteries using the polymeric electrolyte according to an Example of the present invention and a Comparative Example.

300 cycles of charging and discharging were performed with a current density of 3 mA/cm$^2$ in order to calculate the discharge capacity retention rates of the lithium batteries prepared in Example 1 and Comparative example, and the calculation result is shown in FIG. 3.

Referring to FIG. 3, it can be confirmed that the discharge capacity retention rate of the lithium battery prepared in Example 1 of the present invention is much higher than the lithium battery prepared in Comparative Example.

In the lithium polymer battery according to the present invention, reactions at a cathode and an anode are allowed to occur at the optimal pH condition. As a result, the discharge capacity of the lithium polymer battery can be maintained high even with repeated cycles of charging and discharging, thereby improving cycle life characteristics of the battery.

Although the present invention has been described with reference to the specific examples and embodiments, it is understood that the foregoing disclosure should be interpreted as illustrative only and it should be understood that various modifications and variations can be easily made by those skilled in the art without departing the spirit of the invention. Accordingly, a true scope and spirit of the invention should be defined by the accompanying claims and equivalents thereof.

What is claimed is:

1. A lithium polymer battery comprising:
    a cathode;
    an anode;
    a porous separator disposed between said cathode and said anode;
    a first polymeric electrolyte positioned at a first surface of said separator and in contact with said cathode; and
    a second polymeric electrolyte positioned at a second surface of said porous separator and in contact with said anode,
    wherein:
        said first and second polymeric electrolytes use corresponding first and second host polymers, each having a different pH level in an aqueous solution when extracted using water, and
        said first host polymer produces a first aqueous solution extracted using water and has a higher pH level than a second aqueous solution extracted from the second host polymer using water.

2. The lithium polymer battery according to claim 1, wherein said first polymeric electrolyte and said second polymeric electrolyte are stacked or coated on corresponding surfaces of said porous separator.

3. The lithium polymer battery according to claim 1, wherein said first polymeric electrolyte and said second polymeric electrolyte are impregnated into corresponding ones of said cathode and anode.

4. The lithium polymer battery according to claim 1, wherein said first and second polymeric electrolytes comprise organic electrolytic solutions.

5. The lithium polymer battery according to claim 1, wherein said first and second polymeric electrolytes comprise lithium salts.

6. The lithium polymer battery according to claim 1, wherein:
the first host polymer is a polymer comprising a repeated unit of an ethylenically unsaturated compound having a nitrogen-containing substituent, and
the first host polymer is a terpolymer further comprising another repeated unit of vinylidenefluoride and hexafluoropropylene.

7. The lithium polymer battery according to claim 1, wherein:
the first host polymer produces a basic aqueous solution when extracted using water, and
the second host polymer produces a neutral aqueous solution when extracted using water.

8. The lithium polymer battery according to claim 7, wherein the basic aqueous solution extracted from the first host polymer has a pH level of 7.5 or higher.

9. The lithium polymer battery according to claim 7, wherein the basic aqueous solution extracted from the first host polymer has a pH level in the range of 8 to 11.

10. The lithium polymer battery according to claim 7, wherein the neutral aqueous solution extracted from the second host polymer has a pH level of lower than 7.5.

11. The lithium polymer battery according to claim 7, wherein the neutral aqueous solution extracted from the second host polymer has a pH level in the range of 7.

12. The lithium polymer battery according to claim 1, wherein:
the first host polymer produces a basic aqueous solution when extracted using water, and
the second host polymer produces an acidic aqueous solution when extracted using water.

13. The lithium polymer battery according to claim 12, wherein the basic aqueous solution extracted from the first host polymer has a pH level of 7.5 or higher.

14. The lithium polymer battery according to claim 12, wherein the basic aqueous solution extracted from the first host polymer has a pH level in the range of 8 to 11.

15. The lithium polymer battery according to claim 12, wherein the acidic aqueous solution extracted from the second host polymer has a pH level of lower than 7.5.

16. The lithium polymer battery according to claim 12, wherein the acidic aqueous solution extracted from the second host polymer has a pH level in the range of equal to or greater than 5 and less than 7.

17. The lithium polymer battery according to claim 1, wherein:
the first host polymer produces a neutral aqueous solution when extracted using water, and
the second host polymer produces an acidic aqueous solution when extracted using water.

18. The lithium polymer battery according to claim 17, wherein the acidic aqueous solution extracted from the second host polymer has a pH level of lower than 7.5.

19. The lithium polymer battery according to claim 17, wherein the acidic aqueous solution extracted from the second host polymer has a pH level in the range of 5 to 7.5.

20. The lithium polymer battery according to claim 1, wherein the first host polymer is a polymer comprising a repeated unit of an ethylenically unsaturated compound having a nitrogen-containing substituent.

21. The lithium polymer battery according to claim 20, wherein the ethylenically unsaturated compound having the nitrogen-containing substituent is at least one compound selected from the group consisting of vinylpyrridines, vinylpyrrolidones and dimethylaminoethylacrylates.

22. The lithium polymer battery according to claim 20, wherein the first host polymer is a copolymer and further comprises another repeated unit of vinylidenefluoride.

23. The lithium polymer battery according to claim 1, wherein said second polymeric electrolyte comprises a host polymer having a polymer comprising a repeated unit of vinylidenefluoride.

24. A lithium polymer battery comprising:
a cathode
an anode;
a porous separator disposed between said cathode and said anode;
a first polymeric electrolyte positioned at a first surface of said separator and in contact with said cathode; and
a second polymeric electrolyte positioned at a second surface of said porous separator and in contact with said anode,
wherein:
said first and second polymeric electrolytes use corresponding first and second host polymers, each having a different pH level in an aqueous solution when extracted using water,
the first host polymer is a polymer comprising a repeated unit of an ethylenically unsaturated compound having a nitrogen-containing substituent, and
the first host polymer is a terpolymer further comprising another repeated unit of vinylidenefluoride and hexafluoropropylene.

25. A lithium polymer battery comprising:
a cathode;
an anode;
a porous separator disposed between said cathode and said anode;
a first polymeric electrolyte positioned at a first surface of said separator and in contact with said cathode; and
a second polymeric electrolyte positioned at a second surface of said porous separator and in contact with said anode,
wherein:
said first and second polymeric electrolytes use corresponding first and second host polymers, each having a different pH level in an aqueous solution when extracted using water, and
said second host polymer having a vinylidenefluoride-hexafluoropropylene copolymer or a copolymer further comprising a repeating unit of at least one compound selected from the group consisting of acrylic acid and maleic acid monoalkylester.

26. The lithium polymer battery according to claim 25, wherein the maleic acid monoalkylester is maleic acid monomethylester.

27. A method of preparing a lithium polymer battery, comprising:
forming a first polymeric electrolyte layer having a first host polymer on a first side of a separator;
forming a second polymeric electrolyte layer having a second host polymer on a second side of the separator;
gelling the first and second polymeric electrolyte layers; and
placing the separator with the gelled first and second polymeric electrolyte layers between a cathode and an anode to thereby complete the lithium polymer battery such that the first polymeric electrolyte lever is between the separator and the cathode and the second polymeric electrolyte layer is between the separator and the anode, wherein said first host polymer produces a first aqueous solution extracted using water and has a higher pH level than a second aqueous solution extracted from the second host polymer using water.

28. A method of preparing a lithium polymer battery, comprising:

forming a first polymeric electrolyte layer having a first host polymer on a side of a cathode;

forming a second polymeric electrolyte layer having a second host polymer on a side of an anode;

gelling the first and second polymeric electrolyte layers; and placing a separator between the gelled first and second polymeric electrolyte layers of the cathode and the anode to thereby complete the lithium polymer battery, wherein said first host polymer produces a first aqueous solution extracted using water and has a higher pH level than a second aqueous solution extracted from the second host polymer using water.

* * * * *